United States Patent

Aoki

[11] Patent Number: 5,890,203
[45] Date of Patent: *Mar. 30, 1999

[54] DATA TRANSFER DEVICE FOR TRANSFER OF DATA DISTRIBUTED AND STORED BY STRIPING

[75] Inventor: Hiromichi Aoki, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 644,167

[22] Filed: May 10, 1996

[30] Foreign Application Priority Data

May 10, 1995 [JP] Japan ................................. 7-111637

[51] Int. Cl.$^6$ ................................................ G06F 13/00
[52] U.S. Cl. .......................... 711/111; 711/112; 711/113; 711/114; 395/200.31; 395/200.32; 395/200.33; 395/200.61; 395/200.62; 395/200.63; 395/200.68; 395/200.83; 395/308; 395/309; 395/311; 395/312; 395/872; 395/873; 395/876; 395/800.1; 364/133; 348/7
[58] Field of Search ...................... 395/250, 800, 395/872, 441, 287, 309, 500, 873, 200.31, 200.33, 200.61, 200.63, 200.68, 200.83, 308, 311–312, 876, 800.1; 711/111–114; 364/133

[56] References Cited

U.S. PATENT DOCUMENTS

| | | | |
|---|---|---|---|
| 5,471,632 | 11/1995 | Gavin et al. | 395/284 |
| 5,530,830 | 6/1996 | Iwasaki et al. | 711/114 |
| 5,603,058 | 2/1997 | Belknap et al. | 395/855 |
| 5,606,359 | 2/1997 | Youden et al. | 348/7 |
| 5,761,417 | 6/1998 | Henley et al. | 395/200.61 |

Primary Examiner—Tod R. Swann
Assistant Examiner—Denise Tran
Attorney, Agent, or Firm—Sughrue, Mion, Zinn, Macpeak & Seas, PLLC

[57] ABSTRACT

A data transfer device to read the data distributed and stored to a plurality of disk devices by striping and to generate and transfer the stream data, comprises a disk controller connected to said disk device for data reading/writing, a stream data generation controller connected to the disk controller via a first exclusive bus to instruct reading of unit data as pieces of stream data and to generate the stream data from the read unit data for output, a communication controller connected to the stream data generation controller via a second exclusive bus to transfer the stream data output from the stream data generation controller to a predetermined external processor, a general controller to control the stream data generation controller and the communication controller.

10 Claims, 6 Drawing Sheets

DATA TRANSFER DEVICE FOR TRANSFER OF DATA DISTRIBUTED AND STORED BY STRIPING

BACKGROUND OF THE INVENTION

1. Field of the Invention

The present invention relates to a data transfer device to read the data stored in a disk device and transfer them to processors, and particularly relates to a data transfer device which transfers the data distributed and stored in a plurality of disk devices by striping.

2. Description of the Related Art

In some systems such as those for multimedia requiring transfer of a large amount of data at a high speed, the data transfer device to execute the data transfer must have a high data transfer performance.

An example of such multimedia systems is a time-varying image data supply system which handles time-varying images. The object of a time-varying image supply system is to supply a plurality of time-varying images stored in the storage unit such as a disk device to a plurality of processors. Accordingly, the major operation of the time-varying image supply system is to read time-varying images from the storage media. Therefore, a time-varying image supply system comprises a data transfer device called a video server.

Since the data handled in this kind of systems have quite a large size, they are compressed before being stored in disk devices having magnetic disks or optical disks as storage media. The data transfer device mounted on such a system has a processor and a storage unit, as well as an input/output controller connected to them. Usually, it has a plurality of input/output controllers each connected with a disk device. Thus, the data transfer device reads the data in parallel from the disk devices connected to a plurality of input/output controllers, lays them in the correct order, and then sends them to an external interface (network, for example) at a certain transfer rate.

FIG. 6 shows an configuration example of this kind of conventional data transfer device.

As shown in the figure, a data transfer device 100 comprises a plurality of disk controllers 20 and a plurality of communication controllers 60 connected by an input/output bus 150 as well as a processor 110 and a storage unit 120 connected by a system bus 140, and the input/output bus 150 and the system bus 140 are connected via a bus controller 130. In addition, the disk controllers 20 are connected to a plurality of disk devices 90 in one-to-one correspondence.

The time-varying image supply system configured as above firstly reads time-varying image and sound data from the disk device 90 and writes them to the storage unit 120 in the data processor 100, and then sends the data written in the storage unit 120 to the external processors. When there are a plurality of time-varying image and sound data for transfer, they are coordinated for their order and timing of reading.

The processing to read data out of the disk device 90 and write them to the storage unit 120 is executed by the processor 110 and the input/output controller under its control. The processing to send the data written to the storage unit 120 to the network is executed by the processor 110 and the communication controller under its control. In addition to data read/write processing for the storage unit 120, the processor 110 coordinates the data reading from the disk device 90 and data sending to the network, administrates the storage area allocation in the storage unit 120, and controls the flow for each piece of data in a group.

Note that data are distributed and stored in a plurality of disk devices by striping technology in a system required to transfer a large amount of data at a high speed such as a time-varying image supply system. As shown in FIG. 5, the data are divided into units of a certain size so that the units are allocated to the disk devices 90 in a coordinated order for storage.

Data are read in parallel from the disk devices 90. The stream data units read from the disk devices 90 are sent through the disk controller 20 and, via the bus controller 130, stored to the storage unit 120. In the storage unit 120, stream data is generated as entire information comprising a series of data with the unit data laid out in the correct order. The generated stream data is, via the bus controller 130 again, transferred to an external processor by the communication controllers 60.

Thus, in a conventional data transfer device, a series of data transfer processes include the use of the input/output bus 150 and the system bus 140 twice for each before the data is read from the disk device 80 and transferred to an external processor. It is anticipated that conflict among stream data occurs in the input/output bus 150 and the system bus 140. To prevent such conflict of stream data, the input/output bus 150 is required to have a sufficiently higher transfer speed than that for the interface with the disk devices 90. In addition, the system bus 140 is also used for execution of processing by the processor 110 and is required to have an even higher transfer speed than the input/output bus 150.

As described above, a conventional data transfer device reads data from the disk device and stores all of them to the storage unit incorporated in the data transfer device and then reads out the stream data as a bulk from that storage unit to transfer them to an external processor. Therefore, there is a drawback that it requires much time to generate the stream data.

In addition, data passes through the system bus, the bus controller and the input/output bus for data transfer from the disk device to the storage unit and that from the storage unit to an external processor. This means that a high load is imposed on these buses, which results in a low throughput in stream data sending.

Besides, the performance of the input/output bus and the system bus is fixed for each data transfer device in a conventional data transfer device. Thus, when it is necessary to increase the number of the disk devices for a larger disk capacity, the data transfer performance is limited by the performance of the input/output bus and the system bus.

Further, the processor incorporated in the data transfer device executes various processing for disk control and input/output control for network. If the number of accesses to the disk device increases, the processor capability would be insufficient and result in performance for the entire system.

SUMMARY OF THE INVENTION

A first object of the present invention is to provide a data transfer device which satisfies the high speed capability required for buses in such device and reduces the time required for generation and transfer of the stream data.

A second object of the present invention is, in addition to the first object, to eliminate the load concentration to buses or to a particular circuit in the data transfer device and to improve the transfer performance of the device.

A third object of the present invention is to provide a data transfer device capable of flexibly supporting changes including disk device addition.

A fourth object of the present invention is, in addition to the third object, to enable improvement of throughput for generation and transfer of the stream data corresponding to addition of disk devices, and thereby eliminate restriction over the entire system performance.

According to one aspect of the invention, a data transfer device to read the data distributed and stored to a plurality of disk devices by striping and to generate and transfer the stream data, comprising:

a disk control means connected to said disk device for data reading/writing;

a stream data generation control means connected to said disk control means via a first exclusive bus for instructing reading of unit data as pieces of stream data and generating said stream data from said read unit data for output;

a communication control means connected to said stream data generation control means via a second exclusive bus for transferring the stream data output from said stream data generation control means to a predetermined external processor; and a general control means for controlling said stream data generation control means and said communication control means.

In the preferred construction, a plurality of the stream data generation control means are connected in parallel between said first and said second exclusive buses, and said stream data generation control means individually generate the stream data without any mutual intervention, and a plurality of the communication control means are connected to said second exclusive bus in parallel, and said communication control means individually transfer the stream data without any mutual intervention.

In the above-mentioned construction, the stream generation control means further comprises a storage device having a stream data storage area to store at least one stream data, which is divided into subareas to individually store the unit data input from said disk devices via said disk control means, and stores the unit data input from said disk device to said subareas in correspondence and, after all unit data in a stream data are completely stored to said stream data storage area, reads out said unit data according to a predetermined order to send them to said communication control means.

In the preferred construction, the stream generation control means further comprises a buffer to temporarily store the unit data input from said disk device via said disk control means, and a storage device having a stream data storage area to store at least one stream data, which is divided into subareas to individually store said unit data, and once stores the unit data input from said disk device to said buffer and then stores said data unit by unit to said subareas in correspondence and, after all unit data in a stream data are completely stored to said stream data storage area, reads out said unit data according to the predetermined order to send them to said communication means.

In another preferred construction, a plurality of the stream data generation means are connected in parallel between said first and the second exclusive buses and individually generate the stream data without any mutual intervention, and said general control means, when providing a new instruction to said stream data generation control means to generate stream data, inspects the processing statuses at all of said stream data generation control means to specify the stream data generation control means having the minimum number of stream data in process as the device to generate said stream data.

In another preferred construction, a plurality of the stream data generation control means are connected in parallel between said first and second exclusive buses with said stream data generation control means individually generating the stream data without any mutual intervention, a plurality of the communication control means are connected to said second exclusive bus in parallel with said communication control means individually transferring the stream data without any mutual intervention, and the general control means inspects, when providing a new instruction to said stream data generation control means to generate stream data, the processing statuses at all of said stream data generation control means to specify the stream data generation control means having the minimum number of stream data in process as the device to generate said stream data, and when providing a new instruction to said communication control means to transfer stream data, the processing statuses at all of said communication control means to specify the communication control means having the minimum number of stream data in process as the device to transfer said stream data.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
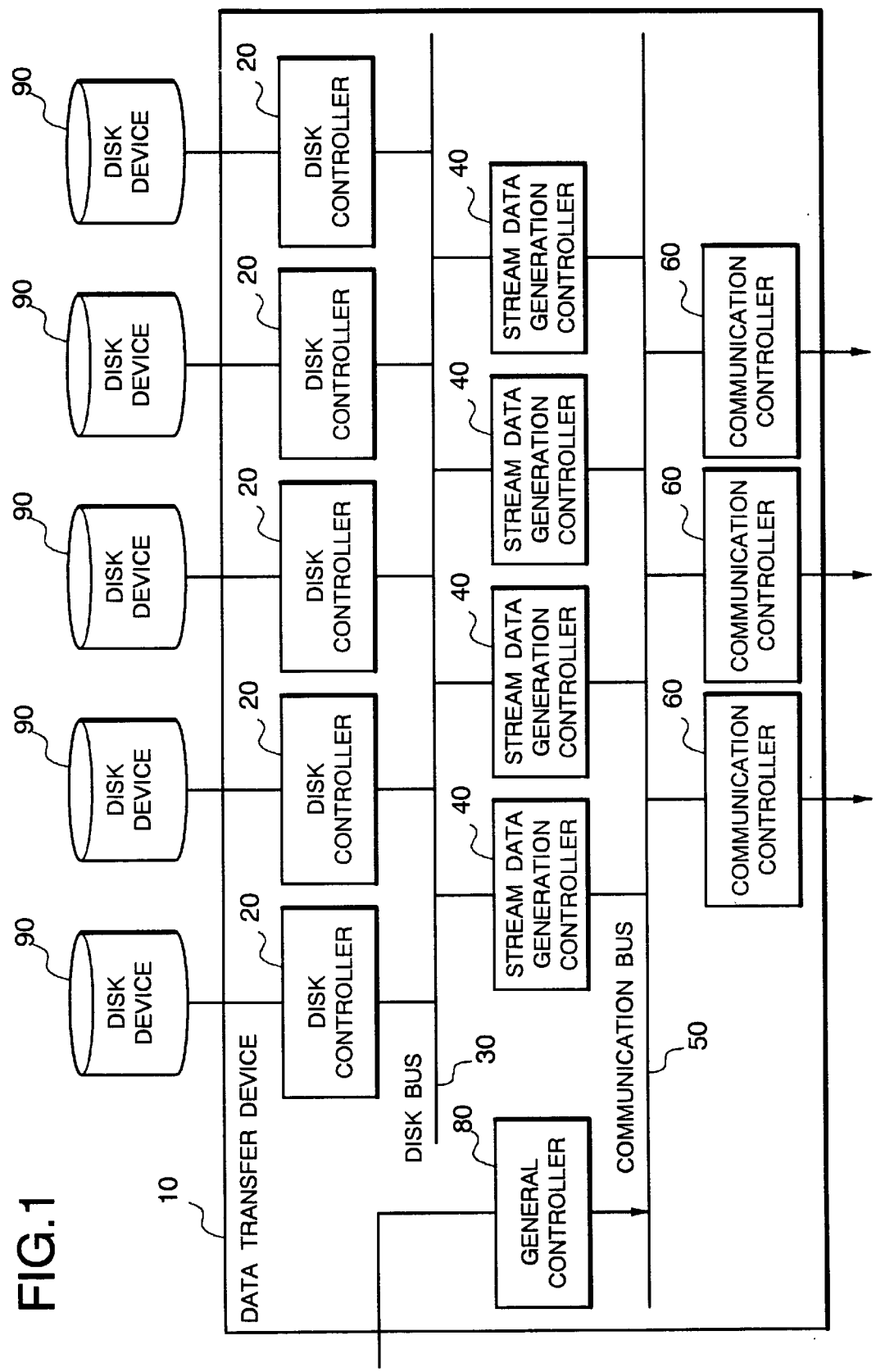
FIG. 1 is a block diagram to show the configuration of a data transfer device according to an embodiment of the present invention.

Referring to the attached figures, a preferred embodiment of the present invention is described in details below. FIG. 1 is a block diagram to show the configuration of a data transfer device according to a first embodiment of the present invention.

As shown in the figure, a data transfer device 10 of this embodiment comprises a plurality of disk controllers 20 to control disk devices 90, stream data generation controllers 40 to generate stream data which are connected to the disk controllers 20 via a disk bus 30, communication controllers 60 to send data to external processors connected to the stream data generation controllers 40 via a communication bus 50, and a general controller 80 to generally control the stream data generation controllers 40 and the communication controllers 60. To the disk controllers 20, the same number of disk devices 90 are connected with making one-to-one correspondence. Note that the figure shows the characteristic configuration elements only and other elements are omitted.

The disk controller 20 has the same function as the disk controller in a conventional data transfer device. It reads data stored in disk devices 90 and writes data into disk devices 90 according to instructions from the stream data generation controller 40. Data read from disk devices 90 are sent to stream generation controllers 40 via the disk bus 30. The disk controllers 20 are in one-to-one correspondence with the disk devices 90 and are connected to the disk bus 30 in parallel. Therefore, when the disk devices 90 are increased to accept increased data amount, the disk controllers 20 are also increased.

Figure 2:
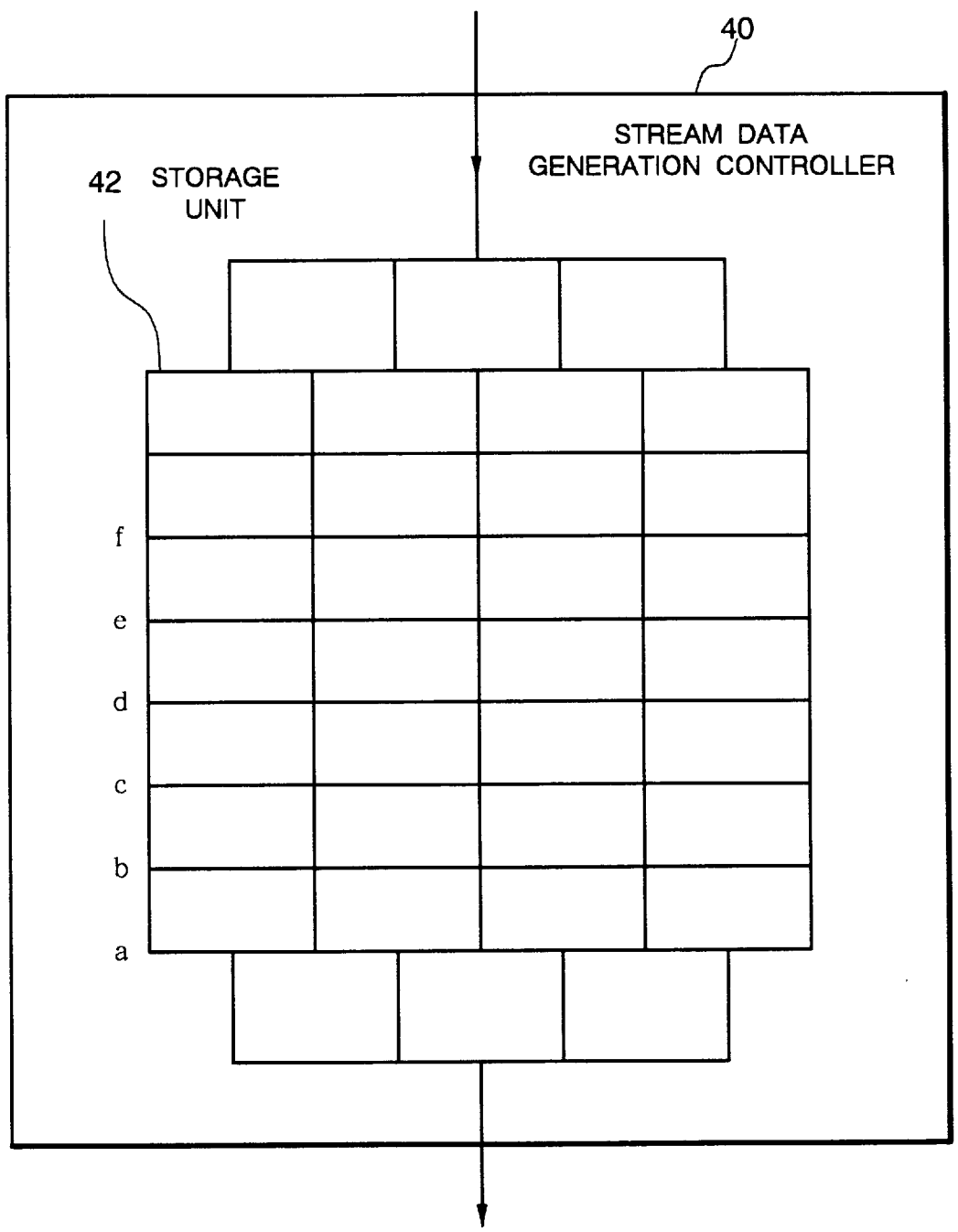
FIG. 2 is a diagram to show an configuration example of a stream data generation controller according to the present invention.

The stream data generation controller 40 is connected to the disk bus 30 and the communication bus 50 and, having them inbetween, positioned between the disk controller 20 and the communication controller 60. According to instructions from the general controller 80, the stream data generation controller 40 instructs the disk controller 20 to read data, generates a group of stream data from the read data, and sends it to the communication controller 60. FIG. 2 shows the configuration of the stream data generation controller 40.

As shown in the figure, the stream data generation controller 40 comprises a storage unit 42 inside to store the data received from the disk controller 20. The storage unit 42 is divided into several areas to store several stream data, each of which is further divided into at least the same number of unit areas as disk devices 90.

In the example of FIG. 2, the storage unit 42 has four stream data storing areas, each of which is further divided into seven unit areas having an address. The pieces of the stream data obtained by the disk controller 20 and sent via the disk bus 30 are retained at the predetermined addresses regardless of their order of arrivals. In other words, the stream data generation controller 40 assigns the particular addresses in the internal storage unit 42 to the transferred stream data pieces and stores the stream data pieces sent from the disk controller 20 to the corresponding addresses.

As shown in FIG. 1, a plurality of stream data generation controllers 40 can be provided in parallel between the disk bus 30 and the communication bus 50. Thus, it is necessary to provide the stream data generation controllers 40 corresponding to the data amount readable from the disk controllers 20. For example, when five disk controllers 20 from which four stream data can be read are connected to the disk bus 30, it is necessary to provide at least four stream data generation controllers 40 having the storage unit 42 capable of storing five stream data. If you have a stream data generation controller 40 having a storage unit 42 capable of containing 20 stream data, you may connect only one controller with such capability.

Figure 3:
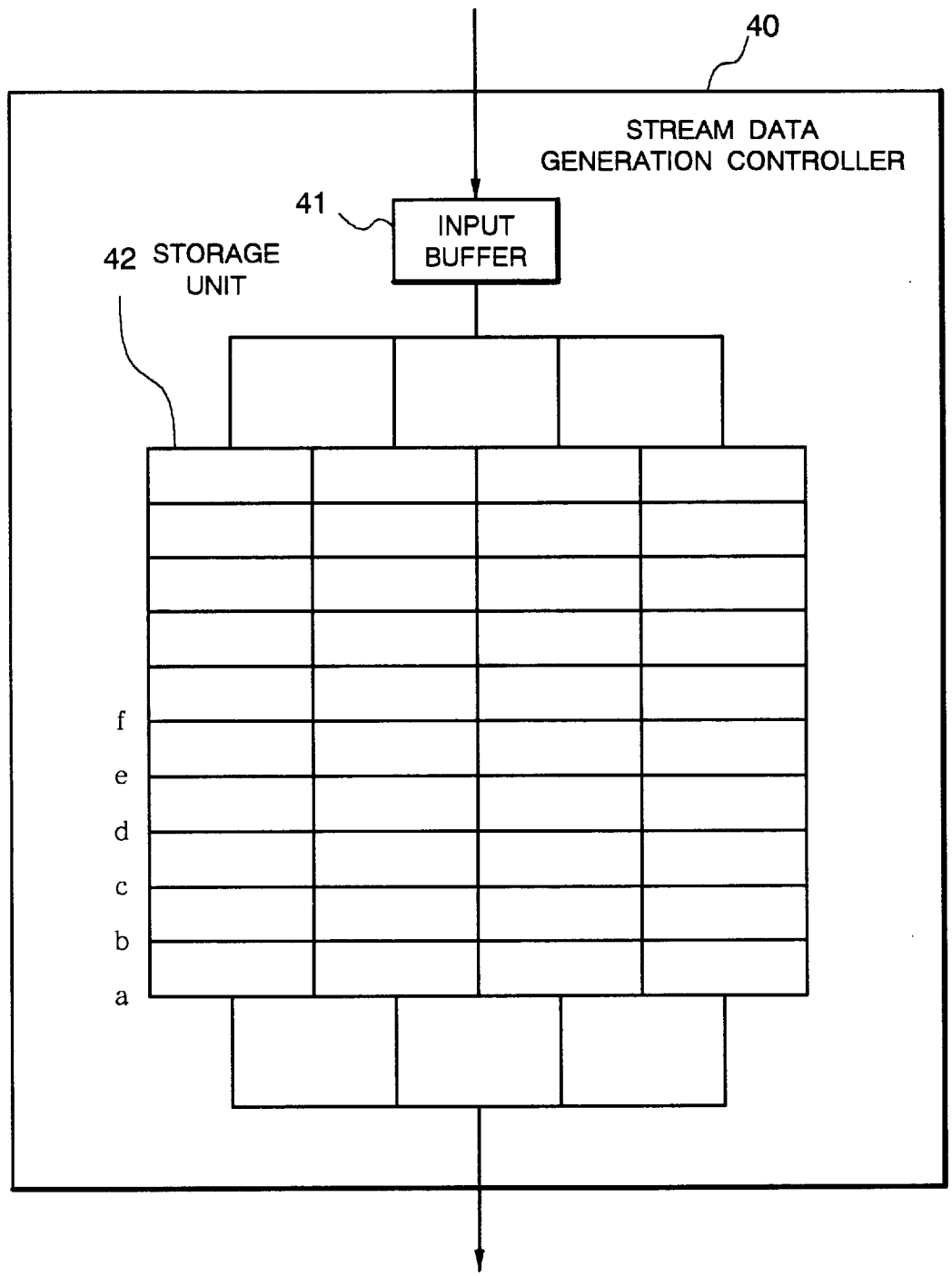
FIG. 3 is a diagram to show another configuration example of a stream data generation controller according to the present invention.

In addition, the stream data generation controller 40 can be, as shown in FIG. 3, provided with an input buffer 41 at the input end. In this case, the data input from the input disk controller 20 is once stored to the input buffer 41 and then moved to the predetermined address in the area to store one stream data.

The stream data generated by the stream data generation controllers 40 are, according to instructions from the general controller 80, sent to the predetermined communication controllers 60. Here, the stream data are output according to the original flow of the stream data regardless of the order of input from the disk controllers. In other words, the response time from the issuance of data read request to the disk device 90 until the applicable data is read and stored to the stream data generation controller 40 depends on the status of the disk device 90. The pieces of stream data stored in the disk devices 90 are not necessarily input from the disk controllers 20 to the stream data generation controllers 40 according to the original order in the stream data flow. To put the stream data in order, each of the areas to contain a stream data in the storage unit 42 of the stream data generation controller 40 is divided into at least the same number of subareas as the disk controllers 20 so that the correspondence with the disk controllers 20 is fixed and the data are sent in the proper order from the predetermined particular area to the communication controllers 60.

The communication controller 60 outputs, according to instructions from the general controller 80, the stream data kept in the storage unit 42 in the stream data generation controller 40 to an external processor via network. As shown in FIG. 1, a plurality of communication controllers 60 can be connected in parallel to the communication bus 50. The number of communication controllers 60 is adjusted corresponding to the transfer performance required in the data transfer device 10 and the throughput of the stream data generation controllers 40. In addition, the communication controller 60 processes the stream data with the processing for lower group in the network protocol, i.e. the processing for the data link and physical layers.

In response to the input of instruction commands from outside, the general controller 80 instructs, via the communication bus 50, the stream data generation controller 40 to generate stream data and to transfer the generated stream data to the communication controller 60. When there are a plurality of stream data generation controllers 40 and a plurality of communication controllers 60, the general controller 80 specifies the stream data generation controller 40 for stream data generation and the communication controller 60 to which the generated stream data is sent.

When the general controller 80 specifies the stream data generation controller 40 and the communication controller 60 to be used, it selects the stream data generation controller 40 and the communication controller 60 with the minimum transfer load among a plurality of controllers. This is because concentrated load to a particular communication controller 60, for example, may cause congestion there resulting in so-called hot spot phenomenon, which can be a major cause of transfer performance deterioration.

Thus, the general controller 80 monitors all of the stream data generation controllers 40 and maintains the status data about the number of the stream data in process at the stream data generation controllers 40. Then, it selects the stream data generation controller 40 with the minimum number of stream data in process to send a new stream data generation request. Similarly, the general controller 80 monitors all of the communication controllers 60 and maintains the status data about the number of stream data in transfer process or waiting for transfer. And it selects the communication controller 60 with the minimum number of stream data in process or waiting for process to provide stream data transfer instruction.

In addition, when transferring the stream data from the stream data generation controller 40 to the communication controller 60, the general controller 80 processes the stream data with the processing for upper group in the network protocol including those for application, presentation, session, transport and network layers and adds the network protocol transfer data.

Besides, since the processes by the general controller 80 are executed not on the system level but on the application level, it is easy to support any change in the number of stream data generation controllers 40 and the communication controllers 60 caused by controller addition or other reasons.

Figure 4:
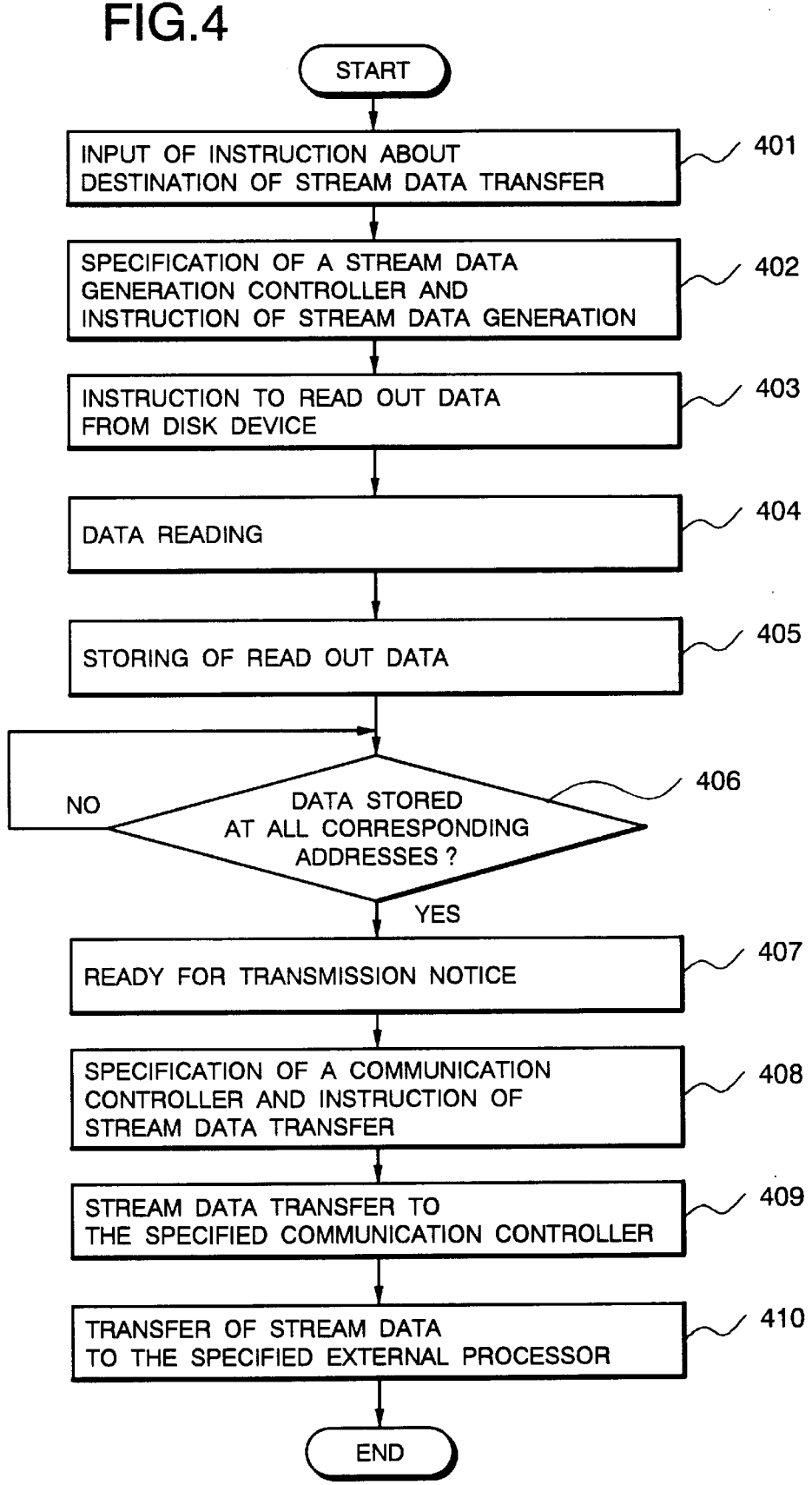
FIG. 4 is a flowchart to show the operation of this embodiment.
Figure 5:
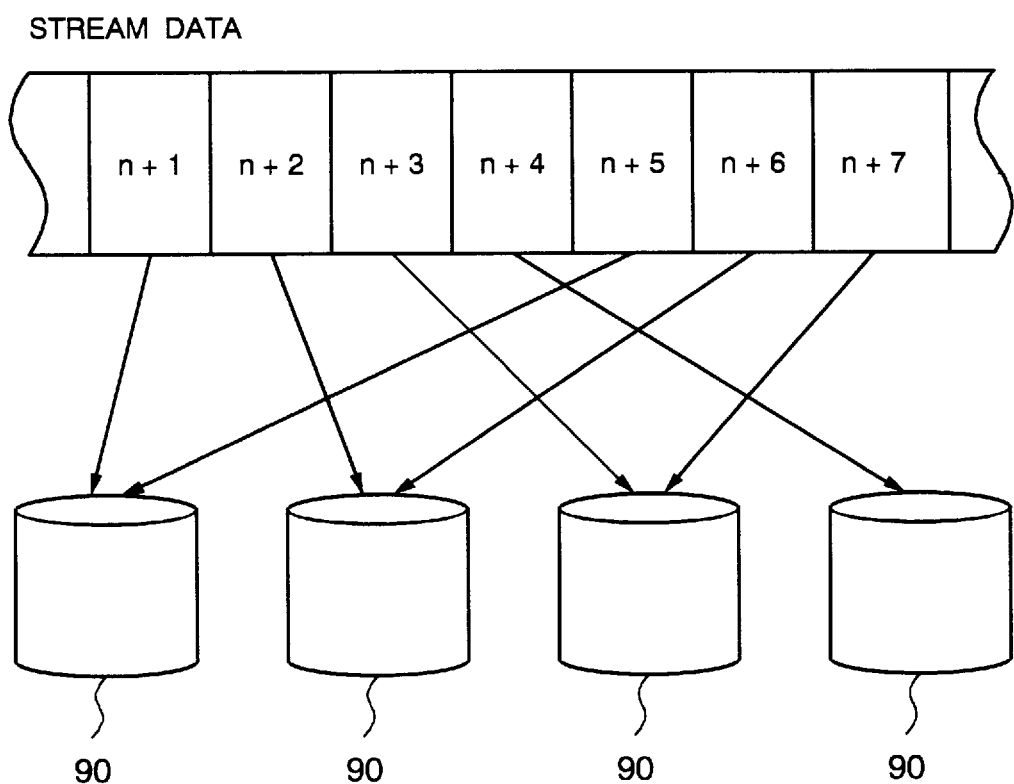
FIG. 5 is a diagram to show the relation between the stream data and the disk devices.
Figure 6:
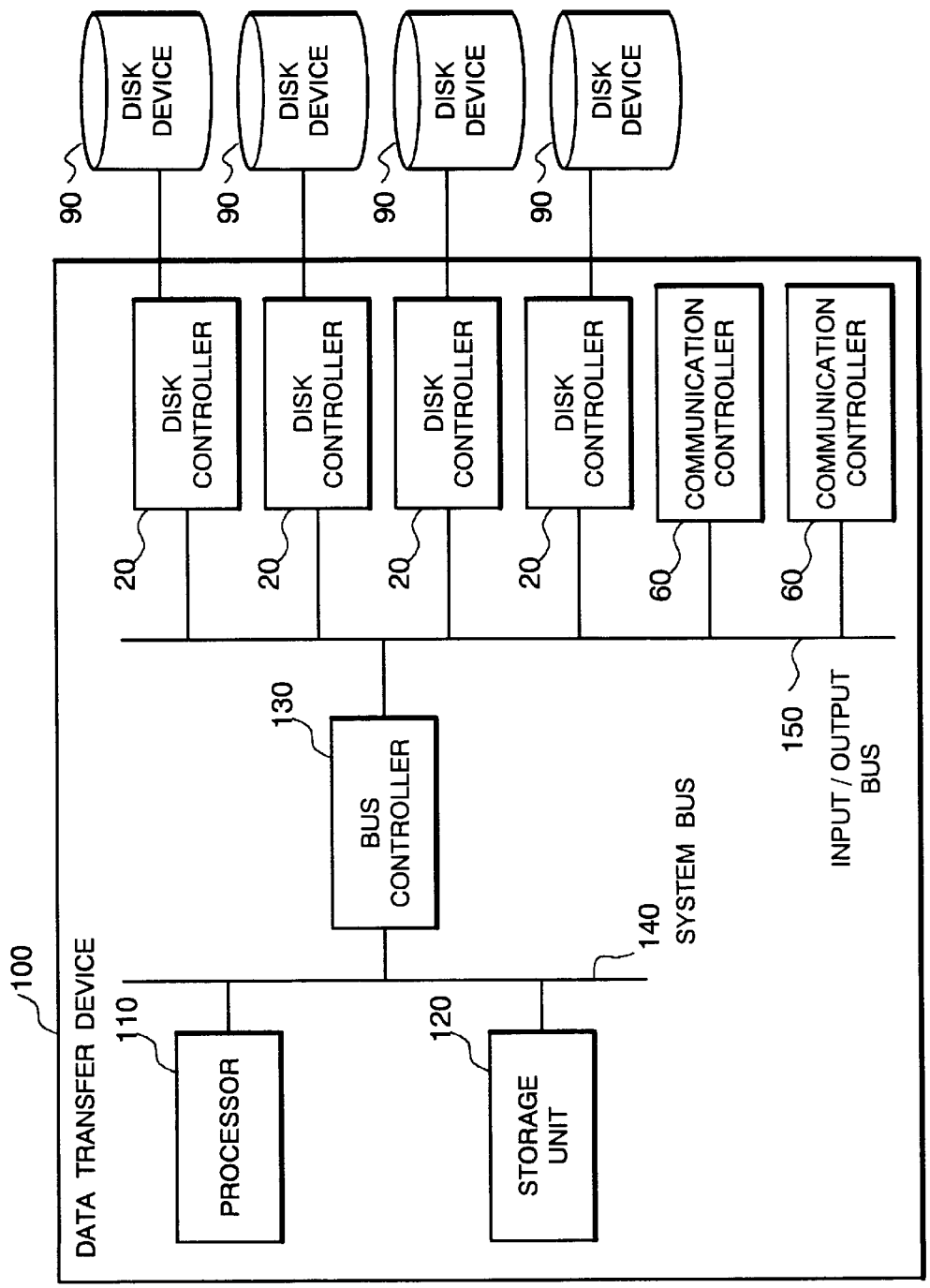
FIG. 6 is a block diagram to show the configuration of a conventional data transfer device.

Next, referring to the flowchart of FIG. 4, the operation in the present embodiment is described below.

The initial operation is that, in response to an instruction from outside to specify the processor as the destination of the stream data, the general controller 80 starts the processing to output the specified stream data to the specified processor (Step 401).

The general controller 80 monitors the statuses of the stream data generation controllers 40, selects the stream data generation controller 40 with the minimum number of data in process, and, via the communication bus 50, instructs stream generation (Step 402).

The stream data generation controller 40 which receives the stream generation instruction provides, via the disk bus 30, a data read instruction to the disk controllers 20 corresponding to the disk devices 90 storing the applicable stream data (Step 403). The disk controllers 20 read the specified stream data pieces from the corresponding disk devices 90 for each unit data and transfer the data to the stream data generation controller 40 (Step 404).

The stream data generation controller 40 allocates the applicable addresses in the storage unit 42 to the data sent from the disk controllers 20 so that they are stored there (Step 405). In other words, the data sent from the disk controllers 20 are retained at the predetermined addresses regardless of their order of arrival, as described above. Suppose here that the storage unit 42 has seven addresses from (a) to (g) as shown in FIG. 2 and the target stream data is stored by striping in the five disk devices 90. In this case, the data representing the pieces of such stream data are allocated to addresses (a) to (e) in the storage unit 42. The data are stored to allocated addresses (a) to (e) in the storage unit 42 regardless of the order they have been sent from the disk controllers 20.

Upon completion of data storing to address (e), the stream data generation controller 40 sends an interrupt signal to the general controller 80 to notify that it is ready for transmission to the communication controller 60 (Steps 406 and 407). Upon receipt of this notice, the general controller 80 specifies the communication controller 60 with the minimum number of stream data in process or waiting for process and instructs the stream data generation controller 40 to transfer the stream data (Step 408). According to instructions from the general controller 80, the stream data generation controller 40 transfers to the specified communication controller 60, the data stored in the storage unit 42 one by one starting from address (a) (Step 409). In this process, the general controller 80 processes the stream data by the processing for upper group in the network protocol.

When the stream data generation controller 40 has the configuration shown in FIG. 2, it issues a data read request to the disk controller 90 to read the data representing next stream data pieces upon completion of data transfer from addresses (a) to (e) to the communication controller 60. In contrast, when the stream data generation controller 40 has the input buffer 41 as shown in FIG. 3, the input buffer 41 can store the data. In this case, the stream data generation controller 40 issues a data read request to the disk controller 90 to read the data representing next stream data pieces upon completion of data transfer from the input buffer 41 to the storage unit 42.

The communication controller 60 transfers, according to instructions from the general controller 80, the stream data received from the stream data generation controller 40 to the specified processor (Step 410). Here, the communication controller 60 processes the stream data with the processing for lower group in the network protocol.

With the above processes, the processes of data reading from the disk device 90, stream data generation and transfer to processors are completed. When there are a plurality of stream data generation controllers 40 and the communication controllers 60 and they transfer a plurality of stream data, the general controller 80 can provide instructions so that a plurality of stream data generation controllers 40 and communication controllers 60 execute processing in parallel. In this case, the general controller 80 monitors, as described above, the processing statuses at all stream data generation controllers 40 and communication controllers 60 and distributes the generation and transfer instructions for stream data so as to prevent a particular stream data generation controller 40 or a communication controller 60 from being excessively loaded with concentrated instructions. Each of the stream data generation controllers 40 individually provides a data read instruction to the applicable disk controllers 20 without any intervention or by other stream data generation controllers 40. Utilization right of the disk bus 30 is assigned to the requests by time sharing.

As described above, in the data transfer device according to the present invention, the load on the disk bus is limited to that caused by data transfer from the disk device to the stream data generation controller, and the load on the communication bus is limited to that caused by stream data transfer from the stream data generation controller to the communication controller. Therefore, the load on the buses in the data transfer device is distributed, which enables high speed operation as required to the buses. In addition, the device can easily accept any change in the number of stream generation controllers and communication controllers resulting from addition of controllers. This enables flexible improvement of system throughput.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A data transfer device to read the data distributed and stored to a plurality of disk devices by striping and to generate and transfer the stream data, comprising:

a plurality of disk control means connected to each of said disk devices for data reading/writing;

a plurality of stream data generation control means connected to said disk control means via a disk bus exclusively used for instructing reading of unit data as pieces of stream data and generating said stream data from said read unit data for output;

a communication control means connected to said stream data generation control means via a communication bus for transferring the stream data output from said stream data generation control means to a predetermined external processor; and a general control means for controlling said stream data generation control means and said communication control means via said communication bus, wherein a plurality of said stream data generation control means are connected in parallel between said disk and communication buses, a plurality of said communication control means are connected in parallel to said communication bus, and said general control means inspects, when providing a new instruction to said stream data generation control means to generate stream data, the processing statuses at all of said stream data generation control means to specify the stream data generation control means based on the number of stream data in process as the device to generate said stream data, and when providing a new instruction to said communication control means to transfer stream data, the processing statuses at all of said communication control means to specify the communication control means based on the number of stream data in process as the device to transfer said stream data.

2. A data transfer device as set forth in claim 1, wherein each of said stream data generation control means individually generate the stream data without interference from other stream data generation control means.

3. A data transfer device as set forth in claim 1, wherein each of said communication control means individually transfer the stream data without interference from other communication control means.

4. A data transfer device as set forth in claim 1, wherein each of said stream data generation control means individually generate the stream data without interference from other communication control means, and each of said communication control means individually transfer the stream data without interference from other communication control means.

5. A data transfer device as set forth in claim 1, wherein the number of said stream generation control means corresponds to the amount of the stream data readable from a plurality of said disk control means, said stream generation control means further comprises a storage device having a stream data storage area to store at least one stream data, which is divided into at least the same number of subareas as said disk control means to individually store the unit data input from said disk devices via said disk control means, and stores the unit data input from said disk device to said subareas in correspondence and, after all unit data in a stream data are completely stored to said stream date storage area, reads out said unit data according to a predetermined order to send them to said communication control means.

6. A data transfer device as set forth in claim 5, wherein each of said stream data generation control means individually generate the stream data without interference from other communication control means.

7. A data transfer device as set forth in claim 1, wherein the number of said stream generation control means corresponds to the amount of the stream data readable from a plurality of said disk control means, said stream generation control means further comprises a buffer to temporarily store the unit data input from said disk device via said disk control means, and a storage device having a stream data storage area to store at least one stream data, which is divided into at least the same number of subareas as said disk control means to individually store said unit data, and once stores the unit data input from said disk device to said buffer and then stores said data unit by unit to said subareas in correspondence and, after all unit data in a stream data are completely stored to said stream data storage area, reads out said unit data according to the predetermined order to send them to said communication means.

8. A data transfer device as set forth in claim 7, wherein each of said stream data generation control means individually generate the stream data without interference from other communication control means.

9. A data transfer device as set forth in claim 1, wherein each of said stream data generation control means individually generate the stream data without interference from other communication control means, and said general control means, when providing a new instruction to said stream data generation control means to generate stream data, inspects the processing statuses at all of said stream data generation control means to specify the stream data generation control means having the minimum number of stream data in process as the device to generate said stream data.

10. A data transfer device as set forth in claim 1, wherein each of said stream data generation control means individually generate the stream data without interference from other communication control means, each of said communication control means individually transferring the stream data without interference from other communication control means, and said general control means inspects, when providing a new instruction to said stream data generation control means to generate stream data, the processing statuses at all of said stream data generation control means to specify the stream data generation control means having the minimum number of stream data in process as the device to generate said stream data, and when providing a new instruction to said communication control means to transfer stream data, the processing statuses at all of said communication control means to specify the communication control means having the minimum number of stream data in process as the device to transfer said stream data.

* * * * *

UNITED STATES PATENT AND TRADEMARK OFFICE
CERTIFICATE OF CORRECTION

PATENT NO. : 5,890,203
DATED : March 30, 1999
INVENTOR(S) : Hiromichi AOKI

It is certified that error appears in the above-indentified patent and that said Letters Patent is hereby corrected as shown below:

Column 8, line 24, after "or", insert --interference--

Signed and Sealed this

Fifth Day of October, 1999

Attest:

Q. TODD DICKINSON

*Attesting Officer*        Acting Commissioner of Patents and Trademarks